Dec. 30, 1941.    W. S. KNOUSE    2,268,256
APPARATUS FOR SURVEYING DEEP WELLS
Filed Feb. 3, 1940    2 Sheets-Sheet 1
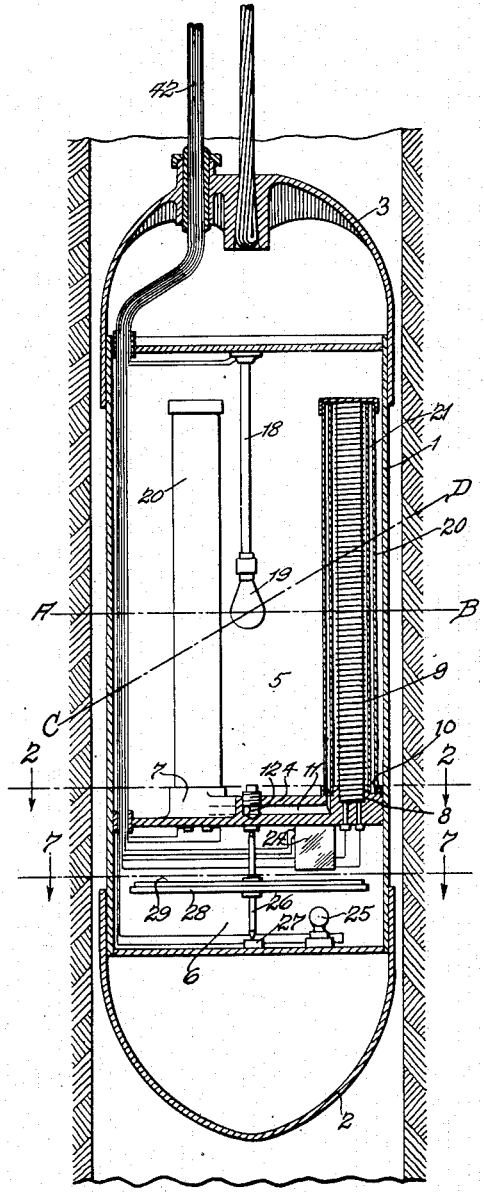
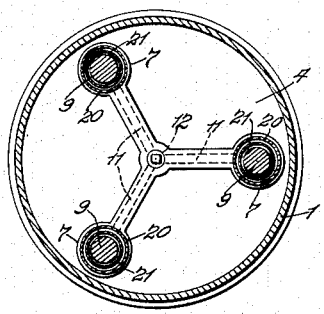
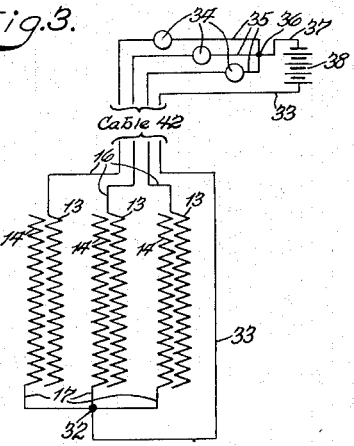
Inventor
William Stanley Knouse
by Brunniga & Sutherland
His Attorneys Dec. 30, 1941.    W. S. KNOUSE    2,268,256
APPARATUS FOR SURVEYING DEEP WELLS
Filed Feb. 3, 1940    2 Sheets-Sheet 2
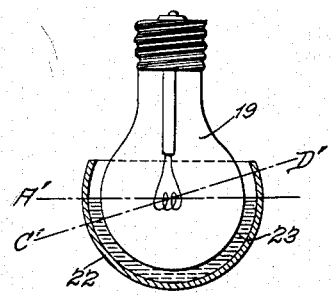
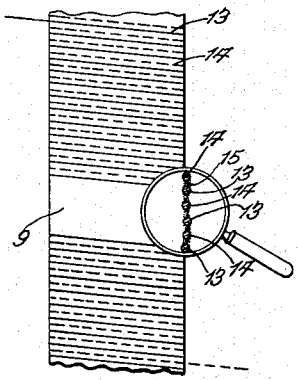
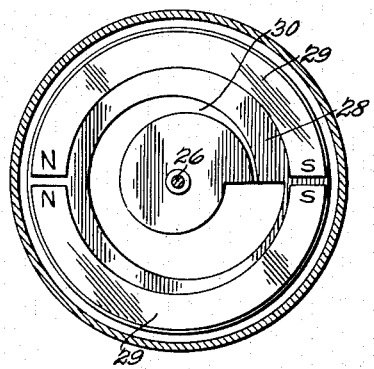
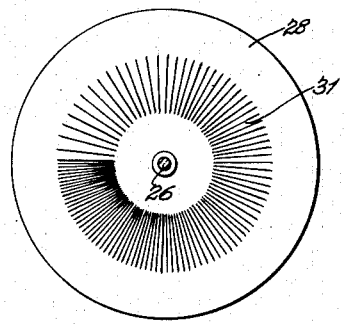
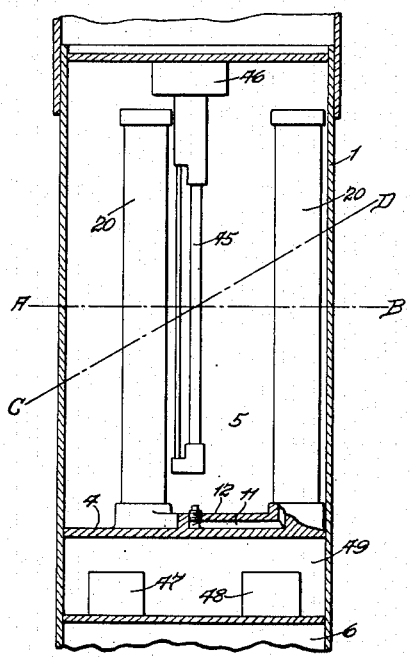
Inventor
William Stanley Knouse Patented Dec. 30, 1941

2,268,256

UNITED STATES PATENT OFFICE 2,268,256

APPARATUS FOR SURVEYING DEEP WELLS

William Stanley Knouse, Hollywood, Calif., assignor, by direct and mesne assignments, of one-half to National Lead Company, New York, N. Y., a corporation of New Jersey Application February 3, 1940, Serial No. 317,113

3 Claims. (Cl. 33—205)

This invention pertains to apparatus for surveying deep wells such as oil wells in order to determine the inclination and direction of the bore hole at any point.

In modern well drilling it is important for the operator to know whether the hole is straight and even to what extent it is inclined and in what compass direction the inclination is leading. It is also customary under certain circumstances to drill a well on an incline purposely, and in such cases it is important to be able to know the direction in which the hole is going at any point.

One of the objects of this invention, therefore, is to provide an apparatus by means of which the operator may determine the inclination of the bore hole to the vertical and also the compass direction in which the inclination lies.

Another object is to provide such an instrument by means of which the operator may read indications from which inclination and compass direction may be determined, such readings being taken at the ground surface while the instrument is in the well.

Another object is to provide such an instrument by means of which readings of the indication may be taken at intervals without removing the instrument from the well.

Another object is to provide such an instrument which is simple in construction and reliable in operation.

Further objects will appear from the following description taken in connection with the accompanying drawings, in which:

Figure 1 is a longitudinal sectional view, somewhat diagrammatic in form, showing an instrument illustrating one embodiment of this invention.

Figure 2 is a section on line 2—2 of Figure 1.

Figure 3 is a diagram illustrating conventionally one way of constructing the energy-sensitive means for indicating the inclination of the instrument, together with a diagram of electrical connections therefor.

Figure 4 is a sectional detail illustrating another way of controlling the energizing means shown in Figure 1.

Figure 5 is a detail of Figure 1.

Figure 6 is a section on line 7—7 of Figure 1 illustrating the means for taking the compass direction.

Figure 7 is a detail illustrating a modified type of shutter for the device of Figure 7, and Figure 8 is a partial section, similar to Figure 1, showing another embodiment of this invention.

In accordance with this invention an instrument is provided which may be lowered into the bore hole and which is so formed that it will assume the general direction of the hole. The instrument is preferably housed in a barrel-like casing so as to fit a round hole, and should be long enough so that the hole will determine the position of the instrument as to its vertical inclination. Arranged within the barrel of the instrument and adjacent the perimeter thereof is a series of three or more upright supports extending longitudinally of the barrel. These supports have distributed therealong energy-sensitive means such as photoelectric cells whose impedances may be varied according to the inclination of the instrument, as will be described hereinafter. Cooperating with the energy-sensitive means, energizing means are provided, such as a source of light in the case of photoelectric cells. Also cooperating with the aforementioned elements, a liquid is provided in the casing of the instrument, so mounted and supported that it may be interposed between the energizing means and the energy-sensitive means in such a manner as to control the effect of the former upon the latter. In the case of the photoelectric cells this liquid may be so placed as to mask portions of said series so as to intercept light from the light source. As the liquid is free to seek its level, the inclination of the instrument will cause it to assume different levels adjacent the different supports so as to mask the sensitive means on the respective supports to different extents. As a consequence, the sensitive means on each support will respond in accordance with the extent of such masking, and this response is then read off by indicating means.

Referring now to the drawings, I designates a casing, preferably of cylindrical or barrel-like form, and dimensioned so as to be insertable into the bore hole and to fit the same closely enough to be positioned thereby but loosely enough so that it may be passed up and down the well freely. This casing may be provided with a lower shoe or guide 2 to guide it in its descent into the well, and a similar upward guide or shoe 3 to guide it in its ascent when it is hauled out of the hole. The casing I may be divided by a partition 4 into compartments 5 thereabove and 6 therebelow.

Figure 1 illustrates an embodiment in which a certain type of photoelectric cell may be employed. In this embodiment the partition 4 is provided with three or more bosses 7, preferably equally spaced around the perimeter thereof. Each boss is provided with a socket 8 adapted to receive a column 9. Surrounding the socket 8 a channel 10 may be provided. The channels 10 of all three of the bosses 7 are connected by passages 11 to a central port 12. By this arrangement all three of the channels 10 are connected together so that liquid may flow freely from one to another.

The column 9 mounted in each of the sockets 8 may be of any suitable insulating material, such as wood, Bakelite, or the like. In the embodiment illustrated, this column is wound with a double helix of closely spaced wires, one of these helices being indicated at 13 in Figure 6 and the other at 14. The spaces between the turns of the helices 13 and 14 is filled with selenium, indicated at 15 in Figure 6 (as seen, enlarged, in the circle). By this arrangement the two helices provide electrodes, from either of which current may flow through the selenium to the other. Since the electrical resistance of selenium varies in accordance with the intensity of illumination falling thereon, the resistance of the unit formed by each column 9 will vary in accordance with the amount of light impinging upon the column. Preferably, lead wires are brought out from the opposite ends of the two helices, as indicated respectively at 16 and 17.

Mounted on a suitable support 18 is a source of light 19 which may be in the form of an incandescent lamp, as shown in Figure 1. This lamp is preferably positioned approximately in the center of the compartment 5 so as to be equidistant from the three columns and also preferably midway of the length of the columns, so that the greatest intensity of illumination will be at that portion of the columns which may become partly masked by the liquid, as will now be described.

Mounted in each of the channels 10 is a pair of concentric transparent tubes 20 and 21. These may be of glass or transparent plastic, or other suitable material. The passage 11 communicates with the space between the two tubes, which space forms an annular jacket around the column 9. This space may be filled with an opaque liquid. For this purpose mercury may be used or any other liquid which is sufficiently opaque to the light supplied by the source 19. The liquid is preferably filled about to the level of the lamp 19, as indicated by the line A—B, representing the level of the liquid when the casing hangs vertically. In this position all three columns 9 and their light-sensitive cells are masked by the liquid below the plane represented by the line A—B, while those portions above this plane are illuminated. The resistance of each unit is represented by the combined resistance of the unmasked portion which is reduced by the illumination thereof, and the resistance of the masked portion which is not so reduced. These separate resistance units are preferably so adjusted that when the casing hangs vertically the resistances of the three column units are all equal. However, when the casing is tipped, the liquid still seeks to maintain its level so that when the instrument is in an inclined bore hole, the level of the liquid will shift from the position AB to a position such as CD. In this position the liquid has risen in some of the tubes 20 toward the top of the casing and fallen in others. Accordingly, the extent of the column which is illuminated by the lamp 19 is now different for different columns and their resistances are correspondingly changed. Indicating instruments placed in circuit with these resistances may now be used to determine the values of these resistances, and these values will indicate the different levels at which the liquid stands adjacent the different columns 9. Accordingly, these levels may be determined by the indication of said instruments, and from these indications the inclination of the casing 1 may be determined.

Instead of placing the masking liquid in the space between the tubes 20 and 21, the arrangement indicated diagrammatically in Figure 4 may be used. In this arrangement a lamp 19 is preferably used which has a bulb of substantially spherical shape and also preferably a concentrated filament providing a small light source. Mounted in any suitable manner so as to surround the lower portion of the lamp 19 is a transparent cup 22 in which is placed the masking liquid indicated at 23. The amount of liquid is so adjusted that when the casing 1 hangs vertically, its upper level represented by the line A'—B' will be substantially on the same level as the center of the filament. This liquid will then cast a shadow masking the lower portions of the columns 9 below the line A—B in the same manner as was done by the liquid in the tubes 20. When the casing is inclined the liquid in the cup 22 assumes a new level, indicated by the line C'—D', and will then cast a shadow represented by the lines C—D in Figure 1.

Other systems of illumination other than that shown in Figure 1 may be used. Figure 8 illustrates an arrangement which perhaps gives a more uniform distribution of light intensity along the units 9. In this figure, 45 designates a "tube" light of the fluorescent or incandescent type supported in any suitable manner with its center of illumination located centrally with respect to the units 9, and its auxiliary devices, such as starters and transformers, enclosed in a suitable housing 46. With this arrangement it is believed that the response of the units 9 will be more nearly proportional to the angle of inclination of the casing.

Mounted in the compartment 6 is a device for determining the compass direction in which the bore hole is inclined. Mounted in the upper portion of the compartment 4 and adjacent the perimeter of the casing 1 is a photoelectric cell 24, and mounted below said cell and in a position to illuminate the same is a source of light such as a lamp 25. Pivoted on a staff 26 in suitable bearings 27 is a shutter 28. This shutter is positioned so as to extend between the lamp 25 and the cell 24 so as to control the amount of illumination received by the latter. The shutter 28 is constructed so as to vary the amount of light passing therethrough in accordance with its position as determined by rotation on the staff 26. This position is determined by a compass, as indicated in Figure 6. The shutter 28, which is of non-magnetic material and may be a card or the like, has mounted thereon a pair of magnets 29. These magnets may be formed in semi-circular shape, as shown in Figure 6. They may, for instance, be constructed of thin sheet metal, such as cobalt steel, capable of receiving and maintaining a high degree of magnetization. Each magnet is in the form of a semi-circle and is strongly magnetized, and the two are placed adjacent one another so as to form together substantially a circle, as shown in Figure 6, with their north and south poles adjacent one another, as indicated, so that these magnets together provide in effect a compass needle extending diametrically across the shutter 28. The shutter, being free to rotate on its staff 26, will at all times take up a position determined by the effect of the earth's magnetic field upon the magnets 29. Accordingly, the diameter of the shutter represented by the north and south poles of these magnets will always be oriented in a north and south direction. The shutter 28 is constructed so as to vary the amount of light passing therethrough from the lamp 25 to the cell 24. As shown in Figure 6, this control is effected by means of a spiral opening 30, gradually changing in width through 360° around the pivot 26. This opening is positioned so that its middle portion stands opposite the lamp 25, and, accordingly, the amount of light passing from the lamp 25 to the cell 24 through the opening 30 will vary in accordance with the position of the shutter 28 and the resulting response of the cell 24, which will be in accordance with the amount of light received, may be measured to indicate the compass direction in which the casing 1 is oriented and thereby show the direction in which the bore hole is inclined. Another way of preparing the shutter 28 to vary the amount of light passing therethrough is to provide a circular section 31 of variable translucency, as shown in Figure 7, the same being gradually shaded in a circumferential direction from an initial portion, which is practically clear and transparent, to a final portion, which is substantially opaque.

As this compass device must be influenced by the earth's magnetic field, the walls of the compartment 6 should be constructed of non-magnetic material such as brass or copper. Any other type of compass device may, of course, be used, such as the gyroscopic compass, in which case the magnetic properties of the casing would be of no importance.

The electric circuits running to these various devices may be arranged, as indicated in Figure 3. In this arrangement all of the leads 17 from the helices 14 on the different columns 9 may be brought together to a common point 32, from which a conductor 33 may lead up to the surface of the ground. The conductor 33, together with the leads 16 from the helices 13, may all be led to the surface, as by a cable 42. At the surface of the ground the leads 16 may be carried to indicating instruments 34, which may be ammeters or milliammeters, adapted to indicate the amount of current flowing through the respective light-sensitive units. From the instruments 34 leads 35 are brought to a common point 36, from which a conductor 37 leads to one terminal of a battery 38, to the other terminal of which the lead 33 is connected. It will be seen that with this arrangement the battery 38 imposes its electromotive force upon the two common points 32 and 36. Between these points three identical circuits lead to the three light-sensitive units, and in each of said circuits an indicating instrument 34 is connected. If now the illumination of the three units is varied by inclining the casing 1, as above described, the amount of inclination may be determined by the change of the respective resistances of the three units, these changes being indicated by the respective currents flowing through the instruments 34. The leads 16, the conductor 33 as well as a pair of conductors from the cell 24, and a pair of conductors for supplying the two lamps 19 and 25 may all be combined into a cable 42 which passes up to the surface of the ground, and the various conductors of which are connected to proper instruments or sources of electric current. These will, of course, include an indicating instrument, such as a milliammeter, in the circuit of the cell 24, while the conductors going to the lamps 19 and 25 may be connected to any suitable source of current of the proper voltage for those lamps.

Instead of depending upon an outside source of power, such as the battery 38, a self-contained power unit may be carried in the casing 1. Such a unit may be a vacuum-tube transmitter operated by a small battery, or other suitable type of generator. In this case small oscillating currents are generated and passed through the units 9 in a manner similar to that described for the battery currents in connection with Figures 3 and 4. For this purpose a generating unit 47 may be provided, and the effects may be amplified by an amplifying unit 48, all of which may be housed in a suitable amplifying compartment 49, as shown in Figure 8.

The above arrangements have been described for using direct current. However, alternating current may be used where desirable, and in such cases impedance coils or simple reactance coils may be used in place of the resistance coils described above.

It will be seen, therefore, that this invention provides a simple structure whereby the form of a well or its deviation from a truly vertical axis may be determined accurately throughout the depth of the well. The apparatus is so arranged that a survey of the hole may be made by simply lowering the device through the well and taking simultaneous readings, at intervals, of the depth to which the instrument has been lowered, the compass direction and the inclination of the barrel, as indicated on the meters 34. Since all of these readings may be taken at the surface of the ground while the instrument is in the well, it will be seen that a great saving of time may be effected thereby. Furthermore, a set of readings may be taken as the instrument is lowered, and another set may be taken as the instrument is raised again from the bottom so that any error in the first set may be checked on the return trip.

The devices for reading the inclination are simple and dependent upon well established scientific principles, so that indications can be obtained which are very accurate. The masking liquid provides an automatic leveling device which controls the indication of the several energy-sensitive devices in accordance with the inclination thereof. These devices are placed in a symmetrical arrangement with respect to a central energizing means, so that the indications are such as to give accurate determinations of the inclination of the barrel.

It will be noted that the energy-sensitive devices, being photo-electric, are permanently sensitive as distinguished from such devices as photo films and the like, which are permanently changed by the photo-chemical action. This makes it possible to obtain instantaneous indications, so that such indications may be observed at the ground level while the survey is in progress, and it is not necessary to make a complete run and withdraw the instrument from the well before information as to the form of the well may be had.

The device lends itself readily to situations either where a source of energy for operating the device may be provided from the surface of the ground, or, where this proves impracticable, a self-contained source of energy may be carried by the instrument itself; and in the latter case the indications may be amplified so that the readings taken at the surface of the ground may be accurate.

While the apparatus and the method have been described as embodied in a unitary system, it will be understood that individual features or sub-combinations thereof may be useful either by themselves or in different groupings or combinations, and that such various groupings or combinations, or even the employment of individual features, are contemplated by this invention when within the scope of the appended claims.

It is also obvious that various changes may be made in the details of construction within the scope of the appended claims without departing from the spirit of this invention, and, accordingly, the invention is not intended to be limited to the specific details shown and described.

Having thus described the invention, what is claimed is:

1. In an apparatus of the character described, a barrel-like casing, three or more upright supports perimetrically arranged in said casing, each of said supports having permanently sensitive energy-sensitive means distributed therealong, energy-radiating energizing means for said sensitive means adapted to energize the same in accordance with the amount thereof exposed to its influence, and a masking liquid in said casing interposed between said sensitive means and said energizing means, said liquid maintaining its level in the casing and masking different portions of said supports from said energizing means in accordance with the inclination of said casing.

2. In an apparatus of the character described, a barrel-like casing, three or more upright supports perimetrically arranged in said casing, each of said supports having energy-sensitive means distributed therealong, energy-radiating energizing means for said sensitive means adapted to energize the same in accordance with the amount thereof exposed to its influence, a masking liquid in said casing interposed between said sensitive means and said energizing means, said liquid maintaining its level in the casing and masking different portions of said supports from said energizing means in accordance with the inclination of said casing, energy circuits from said sensitive means leading to the ground surface and indicating means actuated by one or more of said circuits to indicate the response of said sensitive means.

3. In an apparatus of the character described, a barrel-like casing, three or more upright supports perimetrically arranged in said casing, each of said supports having photo-electric means distributed therealong, energy circuits connected with said photo-electric means, indicating means connectable 'n said circuits to indicate the relative responses of said respective photo-electric means, a source of light positioned to illuminate said photo-electric means, and a masking liquid free to seek its level in said casing and interposed between said light source and said supports.

WILLIAM STANLEY KNOUSE.